United States Patent [19]

Tada et al.

[11] Patent Number: 4,877,101
[45] Date of Patent: Oct. 31, 1989

[54] CONSTANT-SPEED CONTROL DEVICE FOR A VEHICLE

[75] Inventors: Tetsuya Tada, Anjo; Masumi Nagasaka, Toyota; Tatsuo Teratani, Aichi; Akira Miyazaki; Junji Takahashi, both of Kobe, all of Japan

[73] Assignees: Toyota Jidosha Kabushiki Kaisha; Fujitsu Ten Limited, both of Japan

[21] Appl. No.: 120,930

[22] Filed: Nov. 16, 1987

[30] Foreign Application Priority Data

Nov. 26, 1986 [JP] Japan ................................ 61-279618

[51] Int. Cl.⁴ ........................................... B60K 31/08
[52] U.S. Cl. ................................ 180/177; 123/198 DB; 123/325; 180/179; 364/431.05; 364/431.07
[58] Field of Search ............... 180/175, 176, 177, 179; 364/431.07, 431.09, 431.05; 324/160, 161; 123/325, 326, 198 DB

[56] References Cited

U.S. PATENT DOCUMENTS

Re. 27,324  3/1972  Granger et al. ..................... 180/176
4,106,584  8/1978  Matsubara ............................ 180/177
4,371,050  2/1983  Ikeura ................................ 364/431.09
4,476,825  10/1984  Mills ............................. 123/198 DB
4,598,370  7/1986  Nakajima et al. ................... 180/170

FOREIGN PATENT DOCUMENTS 32947  2/1983  Japan ................................. 123/325
60-135334  7/1985  Japan.

Primary Examiner—David M. Mitchell
Assistant Examiner—Eric Culbreth
Attorney, Agent, or Firm—Oliff & Berridge

[57] ABSTRACT

A constant-speed control device for a vehicle including a fuel cut device and a suspending device which suspends a fuel cut operation. An actuator is provided for controlling a throttle valve so that the vehicle runs at a constant speed. The fuel cut device carries out a fuel cut when the degree of opening of the throttle valve is smaller than a predetermined value. The suspending device suspends operation of the fuel cut device until the vehicle speed becomes higher than a target value by a predetermined value.

7 Claims, 6 Drawing Sheets

CONSTANT-SPEED CONTROL DEVICE FOR A VEHICLE

BACKGROUND OF THE INVENTION

1. Field of the Invention

The present invention relates to a constant-speed control device for a vehicle. More particularly, it relates to an improvement of such a device by which a sudden forward running or braked movement (hereinafter surging) of a vehicle when running on a downward slope is prevented.

2. Description of the Related Art

A known constant-speed control device for a vehicle is constructed in such a manner that a target speed is set by a switching operation and a throttle valve is controlled so that the vehicle speed reaches the target speed. In this connection, there is also known a fuel cut device which prevents a fuel supply to the engine, for an improvement of the fuel consumption, when the vehicle is driven at relatively high engine revolutions and the throttle valve is closed to decelerate the vehicle.

In an internal combustion engine provided with both the constant-speed control device and the fuel cut device, a case can occur in which, while the vehicle is running on a downward slope under a constant-speed control, the throttle valve closes the intake passage. In such a case, if the fuel is cut by the fuel cut device, the vehicle speed is suddenly decreased, and the vehicle speed becomes slower than the target speed, and as a result, the throttle valve is opened by the constant-speed control device, so that the fuel supply is resumed. Then, since the vehicle speed is suddenly increased, the throttle valve is moved to close the intake passage again, so that the fuel supply is cut, and thus the vehicle speed is again suddenly decreased. This action is repeated, and thus the engine torque is largely changed due to the opening and closing of the throttle valve. This causes sudden increases and decreases in the vehicle speed, i.e., surging of the vehicle occurs.

SUMMARY OF THE INVENTION

An object of the present invention is to provide a constant-speed control device by which surging of the vehicle does not occur when the vehicle is running on a downward slope under a constant-speed control.

Therefore, according to the present invention, there is provided a constant-speed control device comprising an actuator, a control means, a sensing means, a fuel supply means, a fuel supply prevention means, and a suspending means. The actuator controls the degree of opening of the throttle valve; the control means controls the actuator in accordance with the vehicle speed; the sensing means senses the degree of opening of the throttle valve; the fuel supply means supplies fuel to the engine; the fuel supply prevention means prevents the supply of fuel by the fuel supply means when the degree of opening of the throttle valve is smaller than a predetermined value; and the suspending means is controlled by said control means to suspend operation of the fuel supply prevention means.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

Figure 1:
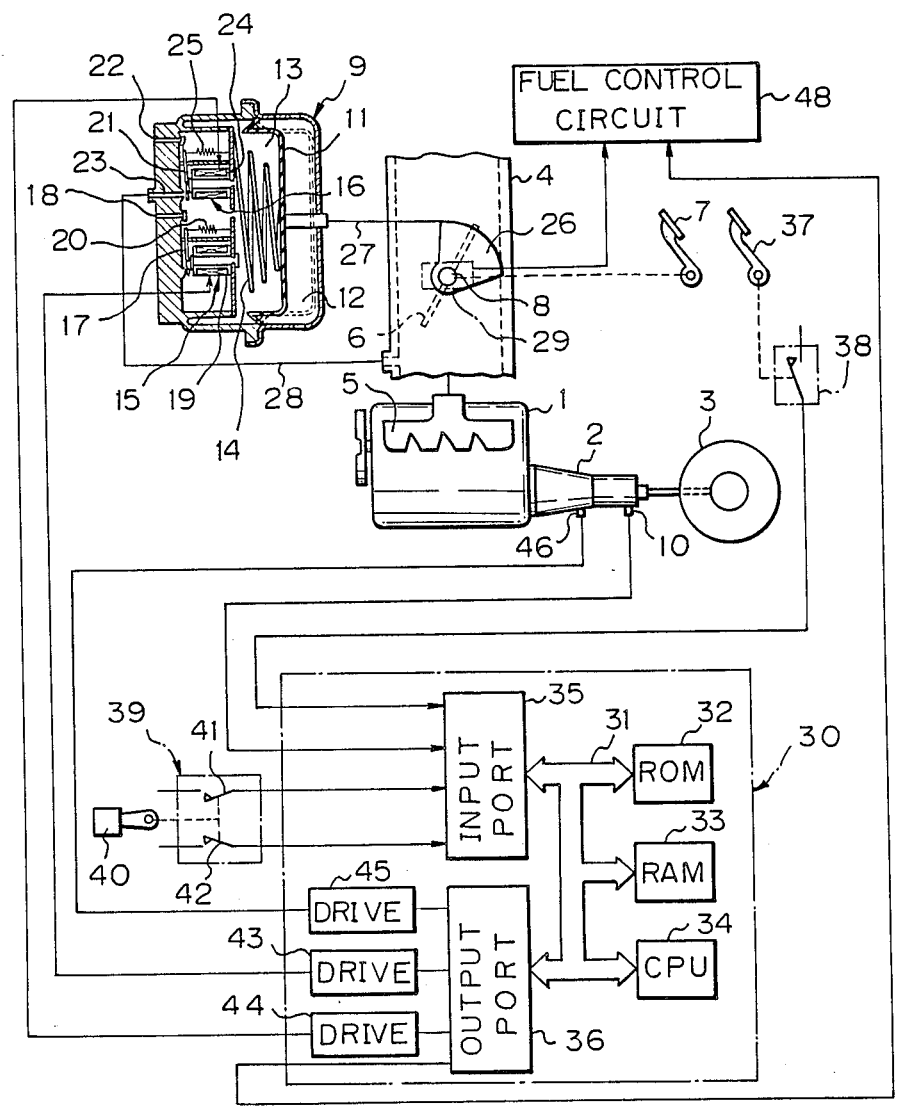
FIG. 1 is a schematic view of a constant-speed control device.

Referring to FIG. 1, a driving wheel 3 is connected to an engine 1 through a transmission gear 2 and is driven by the engine 1. An intake pipe 4 is connected to an intake manifold 5 connected to the engine 1, and a throttle valve 6 is disposed in and rotatably supported by the intake pipe 4 through a throttle shaft 8, to open and close the intake pipe 4. An accelerator pedal 7 is connected to the throttle shaft 8 to change the degree of opening of the throttle valve 6. An actuator 9 is provided for opening and closing the throttle valve 6 to carry out a constant-speed control of the vehicle. A vehicle speed sensor 10 is disposed on the transmission gear 2 to sense the number of revolutions of the driving wheel 3. The vehicle speed sensor 10 generates an output pulse having a frequency proportional to the number of revolution of the driving wheel 3, i.e., generates an output pulse having a frequency proportional to the vehicle speed.

The actuator 9 is formed by a shell which comprises an atmospheric pressure chamber 12 and a negative pressure chamber 13, which chambers 12 and 13 are separated by a diaphragm 11. The atmospheric pressure chamber 12 communicates with the atmosphere, and the negative pressure chamber 13 is provided with a compression spring 14, urging the diaphragm 11 toward the atmospheric pressure chamber 12, a release valve 15, and a control valve 16.

The release valve 15 is a swing valve 17 rotatably supported at the central portion thereof. One end of the swing valve 17 is able to close a hole 18 communicating with the atmosphere, and the other end of the swing valve 17 is subjected to a drawing force exerted by an electromagnetic valve 19 provided adjacent to the swing valve 17. When the electromagnetic valve 19 is de-energized, that is, when the release valve 15 is OFF, the swing valve 17 opens the hole 18 due to a spring force of a tension spring 20, so that the pressure in the negative pressure chamber 13 is the atmospheric pressure. On the other hand, when the electromagnetic valve 19 is energized so that the release valve 15 is ON, the swing valve 17 closes the hole 18.

The control valve 16 is a swing valve 21 rotatably supported at the central portion thereof. One end portion of the swing valve 21 is able to close a hole 22 communicating with the atmosphere, and the other end of the swing valve 21 is able to close a negative port 23 formed in the shell when moved by a drawing force exerted by an electromagnetic valve 24 provided adjacent to the swing valve 21. The negative port 23 communicates with a downstream portion of the throttle valve 6 of the intake pipe 4 through a negative pressure pipe 28, and when the electromagnetic valve 24 is de-energized, that is, when the control valve 16 is OFF, the swing valve 21 is moved to open the hole 22 by a spring force of the tension spring 25, and thus closes the negative port 23. Conversely, when the electromagnetic valve 24 is energized so that the control valve 16 is ON, the swing valve 21 closes the hole 22 and opens the negative port 23.

A lever 26 is attached to the throttle shaft of the throttle valve 6. The lever 26 is a fan-shaped plate having an arc-shaped peripheral portion, and a wire 27 is wound around the arc-shaped peripheral portion of the lever 26 and connected to the diaphragm 11. When the pressure in the negative pressure chamber 13 of the actuator 9 is atmospheric pressure, the diaphragm 11 is moved to the right, as shown by a broken line in FIG. 1, so that the throttle valve 6 is moved to the idling position. In this condition, the throttle valve 6 is closed when the accelerator pedal 7 is operated. Conversely, if a negative pressure is present in the negative pressure chamber 13, the throttle valve 6 is compulsorily closed because the diaphragm 11 is moved to the left in the Figure. Namely, the amount of opening of the throttle valve 6 is determined by the negative pressure in the negative pressure chamber 13, which is controlled by the control valve 16. The release valve 15 and the control valve 16 are connected to, and controlled by output signals from, the electronic control unit 30.

An idle switch 29 is connected to the throttle shaft 8. The idle switch 29 outputs an ON signal when the degree of opening of the throttle valve 6 is smaller than a predetermined value, that is, when the throttle valve 6 has substantially completely closed the intake pipe 4.

The electronic control unit 30 comprises a digital computer, and is provided with a read only memory (ROM) 32, a random access memory (RAM) 33, a central processing unit (CPU) 34, an input port 35, and an output port 36, which elements are interconnected by a bidirectional bus 31.

The input port 35 is connected to a vehicle speed sensor 10, a cancel switch 38 turning ON when, for example, the brake pedal 37 is operated, and a control switch 39. The control switch 39 comprises a set-deceleration switch 41 and a resume-acceleration switch 42 both operated by a lever 40. If the lever 40 is flicked in one direction, the set-deceleration switch 41 is turned ON, and if the lever 40 is flicked in the other direction, the resume-acceleration switch 42 is turned ON.

The set-deceleration switch 41 is operated when the driver wishes to keep the vehicle speed at the present speed, or wants to decelerate the vehicle during a constant-speed control. To adjust the speed of the vehicle, the driver first turns the set-deceleration switch 41 ON, and then when the desired speed is obtained turns the switch 41 OFF gain. The speed at the time the switch 41 is turned OFF is memorized and a constant-speed control is carried out at that speed.

The resume-accelerating switch 42 is provided for carrying out a resume operation or an accelerating operation. In the resume operation, after the cancel switch 38 is turned ON and the constant-speed control is cancelled, the vehicle speed is returned to constant-speed control. In the accelerating operation the vehicle speed is increased while the vehicle is under a constant-speed control.

The output port 36 is connected to the electromagnetic valve 19 of the release valve 15 through a drive circuit 43, and connected to the electromagnetic valve 24 of the control valve 16 through a drive circuit 44. The output port 36 is also connected to an overdrive solenoid 46 of the transmission gear 2 through a drive circuit 45. When the overdrive solenoid 46 is energized, the transmission gear 2 is in the overdrive position, i.e., the top gear position. When the overdrive solenoid 46 is de-energized, the transmission gear 2 moves to a position lower than the overdrive position by one step, for example, the third gear position. Further the output port 36 is connected to a fuel control circuit 48, which is provided with a micro-computer. The fuel control circuit 48 controls the amount of fuel supplied to the engine, and is constructed in such a manner that fuel supply is cut when an ON signal indicating a completely closed condition of the throttle valve 6 is input from the idle switch 29.

First, the basic operation of the constant-speed control device is described below.

Figure 2:
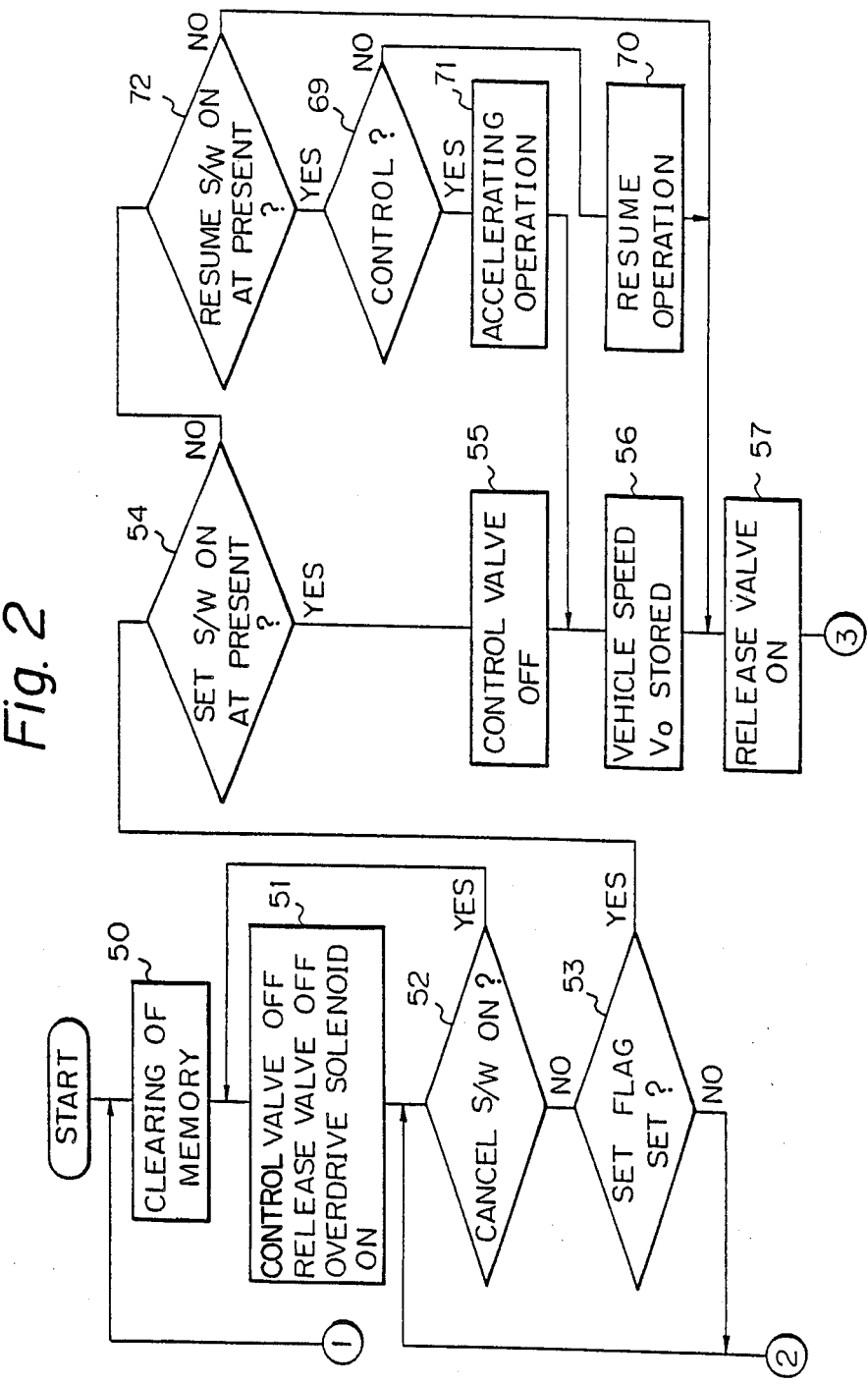
FIG. 2 and FIG. 3 are flow charts of the operation of a constant-speed control.
Figure 3:
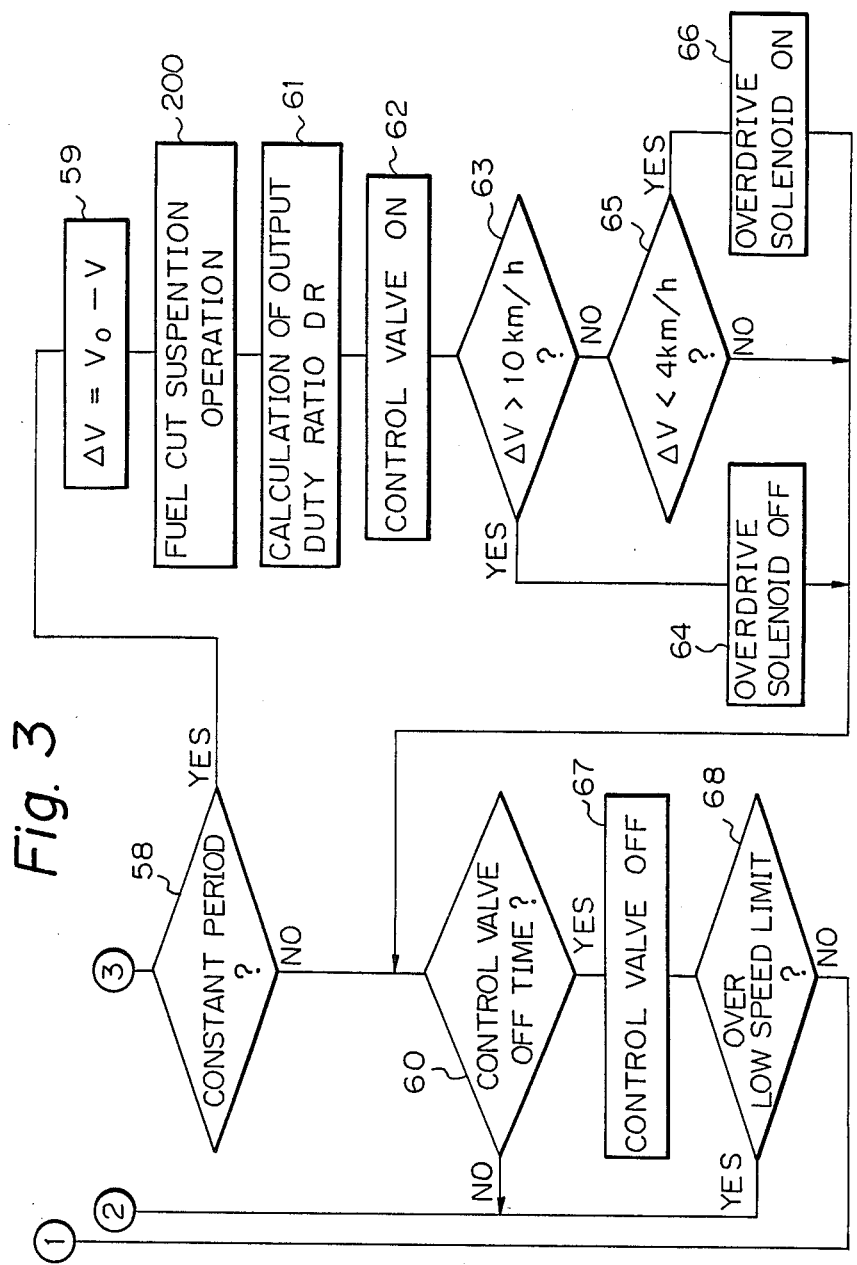

Referring to FIGS. 2 and 3, in step 50, data stored in the RAM 33, especially, a set vehicle speed set by a driver is cleared. Then, in step 51, the control valve 16 and the release valve 15 are turned OFF, and the overdrive solenoid valve 46 is turned ON. When the control valve 16 and the release valve 15 are turned OFF, the pressure in the negative pressure chamber 13 of the actuator 9 becomes the atmospheric pressure, and thus the lever 26 connected to the throttle shaft 8 is returned to the position in which the throttle valve 6 is open to the idling opening degree. At this time, the throttle valve 6 is controlled by the accelerator pedal 7, and therefore, a constant-speed control is not carried out. Further, at this time, since the overdrive solenoid 46 is turned ON, the transmission gear 2 is in the overdrive position.

Then, in step 52, it is determined whether or not the cancel switch 38 for stopping the constant-speed control is turned ON. When the brake pedal 37 is operated, for example, the cancel switch 38 is turned ON, so that the process is returned to step 51. When the cancel switch 38 is not turned ON, the process proceeds to step 53, and it is determined whether or not a set flag is set. The set flag is set when the set-deceleration switch 41 or the resume-acceleration switch 42 are turned ON, and is reset when the cancel switch 38 is turned ON. If the set flag is not set at step 53 the process returns to step 52. If the set flag is set at step 53, the process proceeds to step 54.

As described above, the set flag is reset when the cancel switch 38 is turned ON. Therefore, if the cancel switch 38 is turned ON, the process is returned from step 53 to step 52 until the set-deceleration switch 41 is turned ON again.

Figure 4:
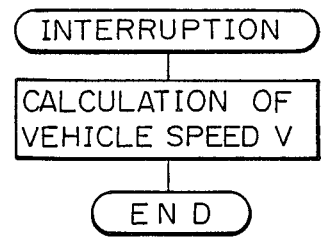
FIG. 4 is a flow chart for the calculating of a vehicle speed.

At step 54, it is determined whether or not the set-deceleration switch 41 is now turned ON. If the set-deceleration switch 41 is turned ON, the process proceeds to step 55, and the control valve 16 is turned OFF. That is, the control valve 16 allows the hole 22 to remain open. The process then proceeds to step 56, wherein the present vehicle speed V is stored in the RAM 33 as $V_0$. Note, that the vehicle speed V is calculated by a routine executed at predetermined intervals as shown in FIG. 4. The process then proceeds to step 57, whereby the release valve 15 is turned ON, and thus the hole 18 is closed.

Then, as shown in FIG. 3, the process proceeds to step 58. In the steps following the step 58, the control valve 16 is turned ON at step 62, and then the time for which the control valve 16 has been turned OFF is obtained. However, since the cycle of this process is carried out very rapidly, the time for which the valve 16 is turned OFF is extremely short, and accordingly, the control valve 16 considered to be substantially OFF during that cycle, so that the control valve 16 keeps the hole 22 open, and therefore, control of the throttle valve 6 by the actuator 9 is not carried out at that time.

If at step 54, the set-deceleration switch 41 has been turned OFF the process proceeds to step 72, where it is determined whether or not the resume-acceleration switch 42 is turned ON. At this time, since the resume-acceleration switch 42 is usually turned OFF, the process jumps to step 57. Note, the vehicle speed V just before the set-deceleration switch 41 is switched from ON to OFF is stored as a target vehicle speed $V_0$ in the RAM 33.

At step 58, it is determined whether or not a predetermined constant period has elapsed. If a constant period has elapsed, the process proceeds to step 59. That is, every time the process proceeds to step 58, it is determined whether or not a constant period has elapsed since the process proceeded to step 59 at a previous time. Generally, the process then proceeds to step 60, but the process proceeds to step 59 if a constant period has elapsed.

At step 59, the difference $\Delta V$ between the present vehicle speed V and the target vehicle speed V is calculated, and the process then proceeds to step 200, where a fuel cut suspension operation is carried out, as described later. The process then proceeds to step 61, and an output duty ratio DR of a control pulse for the control valve 16 is calculated. This output duty ratio DR is calculated basically by $$DR = DR \cdot + k \cdot \Delta V.$$

That is, the duty ratio DR is calculated by adding $k \cdot \Delta V$ to the former duty ratio DR. he larger the vehicle speed difference $\Delta V$, the larger the added value $k \cdot \Delta V$. Note, k is a constant value. The duty ratio DR is a percentage of the time for which the control pulse given to the control valve 16 is ON. If the percentage of time is high, the time for which the negative port 23 is open is long in comparison with the time for which the hole 22 is open, so that the negative pressure in the negative pressure chamber 13 is large, and thus the degree of opening of the throttle valve 6 is increased. That is, in step 61, the output duty ratio DR necessary for controlling the vehicle speed V to be close to the target vehicle speed $V_0$ is calculated.

Figure 5:
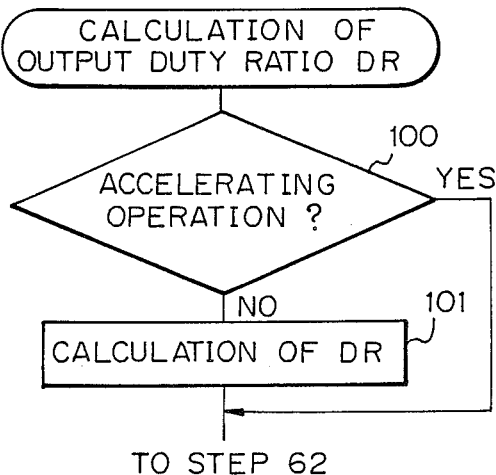
FIG. 5 is a flow chart for the calculating of an output duty ratio.

FIG. 5 shows the process carried out at step 61 in FIG. 3. As shown in the Figure, at step 100, it is determined whether or not an accelerating operation is being carried out. The accelerating operation is an operation in which the output duty ratio DR of the control pulse for the control valve 16 is kept at approximately the maximum value. If the accelerating operation is not being carried out, the process proceeds to step 101, and the output duty ratio DR is obtained based on the vehicle speed difference $\Delta V$, as described above. Conversely, if the accelerating operation is being carried out, the process skips step 101, and the output duty ratio DR is kept at a value close to the maximum value obtained in the accelerating process.

Returning to FIG. 3, at step 62, the control valve 16 is turned ON and the process proceeds to step 63. At step 63, it is determined whether or not the vehicle speed difference $\Delta V$ obtained in step 59 is larger than 10 km/h. If the vehicle speed difference $\Delta V$ is larger than 10 km/h, the process proceeds to step 64 and the overdrive solenoid 46 is turned OFF. That is, if the vehicle speed V is lower by more than 10 km/h than the target vehicle speed V during constant-speed running, the transmission gear 2 is moved down by one step so that the driving force at the driving wheel is increased. If the vehicle speed difference $\Delta V$ is lower than 10 km/h, the process proceeds to step 65, where if the vehicle speed difference $\Delta V$ is less than 4 km/h, the overdrive solenoid 46 is energized again at step 66, and thus the transmission gear 2 is placed in the overdrive position and the process proceeds to step 60.

If the vehicle speed difference is higher than 4 km/h, the process proceeds to step 60.

At step 60, it is determined, based on the output duty ratio DR calculated in step 61, whether or not the control valve should be turned OFF at that time. If the control valve 16 should not be turned OFF at that time, the process proceeds to step 52, and a constant-speed control is carried out until the cancel switch 38 is turned ON. Conversely, if the control valve 16 should be turned OFF at that time, the process proceeds to step 67, where the control valve 16 is turned OFF, and the process then proceeds to step 68.

At step 68, it is determined whether or not the vehicle speed V is higher than the minimum speed, for example, 40 km/h, for carrying out the constant-speed control. If the vehicle speed V is higher than the minimum speed, the constant-speed control is carried out until the process proceeds to step 52 and the cancel switch 38 is turned ON. When the vehicle speed V is lower than the minimum speed, the process proceeds to step 50, and the target speed $V_0$ is cleared from the RAM 33 and the process then proceeds to step 51, in which the control valve 16 is returned to the initial state so that the constant-speed control is stopped. As described above, since the set flag is reset in step 51, a constant-speed control is not carried out until the set-decelerating switch 41 is operated again.

During a constant-speed control, if the set-decelerating switch 41 is turned ON, the process proceeds from step 54 to step 55, and the control valve 16 is turned OFF while the set-decelerating switch 41 is turned ON. If the control valve 16 is turned OFF, since the pressure in the negative pressure chamber 13 of the actuator 9 becomes atmospheric pressure, the throttle valve 6 is open to the degree of idle opening, so that the vehicle continues to decelerate. At the same time, in step 56, the present vehicle speed V is stored as $V_0$, and then, when the set-decelerating switch 41 is turned OFF, the vehicle speed V just before the set-decelerating switch 41 is turned OFF is set as a target vehicle speed $V_0$. The vehicle speed V is then controlled at a constant speed to be close to the target speed $V_0$.

If the set-acceleration switch 41 is OFF at step 54, the process proceeds to step 72, where it is determined whether the resume-accelerating switch 42 is ON or OFF. If the resume-accelerating switch 42 is turned ON, the process proceeds from step 72 to step 69, where it is determined whether or not a constant-speed control is being carried out. When a constant-speed control is not being carried out, the process proceeds to step 70, and a resume operation is carried out. In the resume operation, the output duty ratio DR of the control pulse for the control valve 16 is kept close to the maximum value so that the throttle valve 6 is kept almost fully open until the vehicle speed V is close to the previous target speed $V_0$. That is, in the resume operation, the vehicle speed V is suddenly brought close to the target speed $V_0$. After the resume operation is completed, a usual constant-speed control is carried out. On the other hand, if a constant-speed control is carried out when the resume-accelerating switch 42 is turned ON, the process proceeds from step 69 to step 71, so that an accelerating operation is carried out. As described above, in the accelerating operation, the output duty ratio DR of the control pulse for the control valve 16 is kept at almost the maximum value.

Therefore, while the resume-accelerating switch 42 is turned ON, since the throttle valve 6 is almost fully open, the vehicle speed V is suddenly increased. Then, when the resume-accelerating switch 42 is turned OFF, the vehicle speed V just before the resume-accelerating switch 42 is turned ON is stored as a target speed $V_0$, and subsequently, the vehicle is controlled to a constant speed close to the target speed $V_0$.

Described above is the basic operation of the constant-speed control, and from the above description, it can be understood that, when the resume-accelerating switch 42 is turned ON so that an accelerating operation or a resume operation is carried out, the throttle valve 6 is almost fully open, so that the vehicle speed V is suddenly increased.

In this embodiment, a fuel cut suspending operation is carried out in the step 200. The fuel cut suspending operation is provided for suspending a fuel cut operation so that surge is prevented when the vehicle is running on a downward slope under a constant-speed control.

Figure 6:
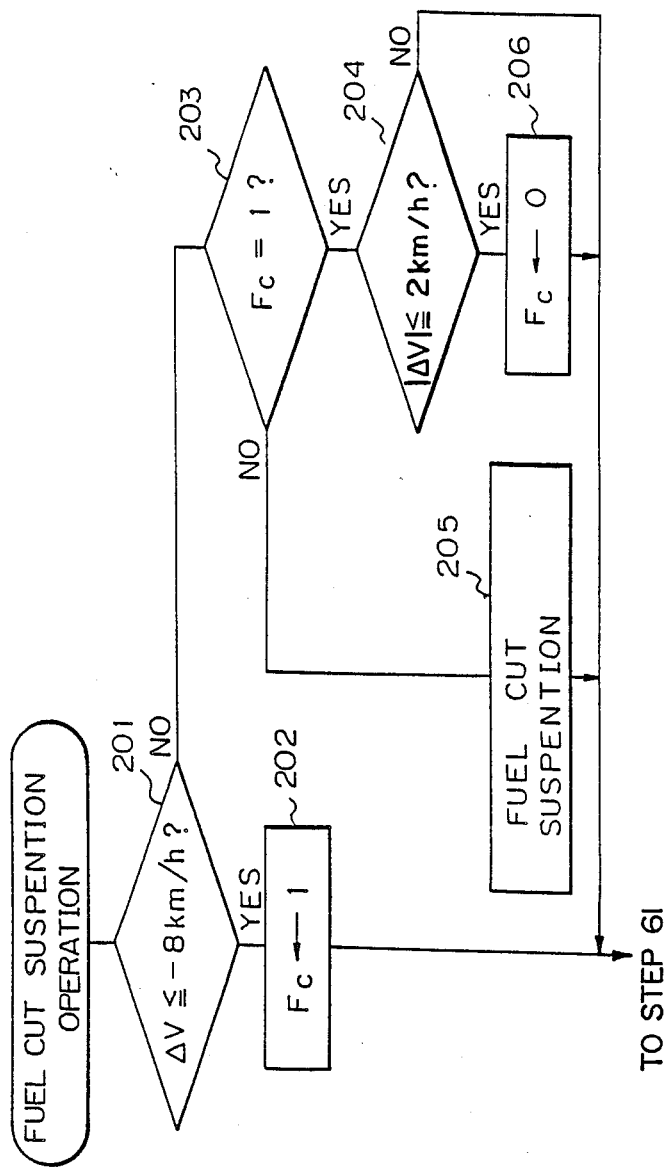
FIG. 6 is a flow chart for the suspension of a fuel cut operation.

With reference to FIG. 6, at step 201, it is determined whether or not the speed difference $\Delta V$ between the target speed $V_0$ and the present vehicle speed V is smaller than $-8$ km/h, that is, whether or not the present vehicle speed V is higher than the target speed V by 8 km/h. Such a phenomenon can occur when the vehicle runs on a downward slope. Thus, when the vehicle speed V is too high, a fuel cut flag Fc is set in step 202. In this state, the fuel control circuit 48 carries out a fuel cut operation if an ON signal is input from the idle switch 29.

Conversely, in step 201, if the vehicle speed V is not higher than the target speed $V_0$ by 8 km/h, the process proceeds to step 203, where it is determined whether or not the flag Fc is set. If the flag Fc is set, at step 204 it is determined whether or not the absolute value of the speed difference $\Delta V$ is within 2 km/h at step 204. If the absolute value is less than 2 km/h, the flag Fc is reset at step 206, and if the speed difference $\Delta V$ is higher than 2 km/h, step 206 is omitted and the process proceeds to step 61. Namely, if the vehicle speed V approaches the target value due to the fuel cut operation, the flag Fc is reset. Therefore, in a later execution of this program, the process proceeds from step 203 to step 205, and a command signal for suspending the fuel cut is output to the fuel control circuit 48. When a command signal is input to the fuel cut circuit 48, the circuit 48 does not carry out a fuel cut even if an ON signal is input from the throttle sensor 29.

Figure 7:
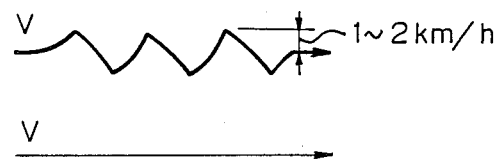
FIG. 7 is a graph showing a changing of a vehicle speed in a prior art and in an embodiment of the present invention.

Therefore, according to this embodiment, when the speed difference between the actual vehicle V and the target value is within 2 km/h, since the fuel cut control is suspended, the changes in the vehicle speed as shown in FIG. 7(a) are eliminated, and thus the vehicle speed is kept almost completely constant, as shown in FIG. 7(b). If the increase in the vehicle speed is relatively large, a fuel cut is carried out, and therefore, sufficient engine braking is obtained when the vehicle runs on a steep downward slope.

Figure 8:
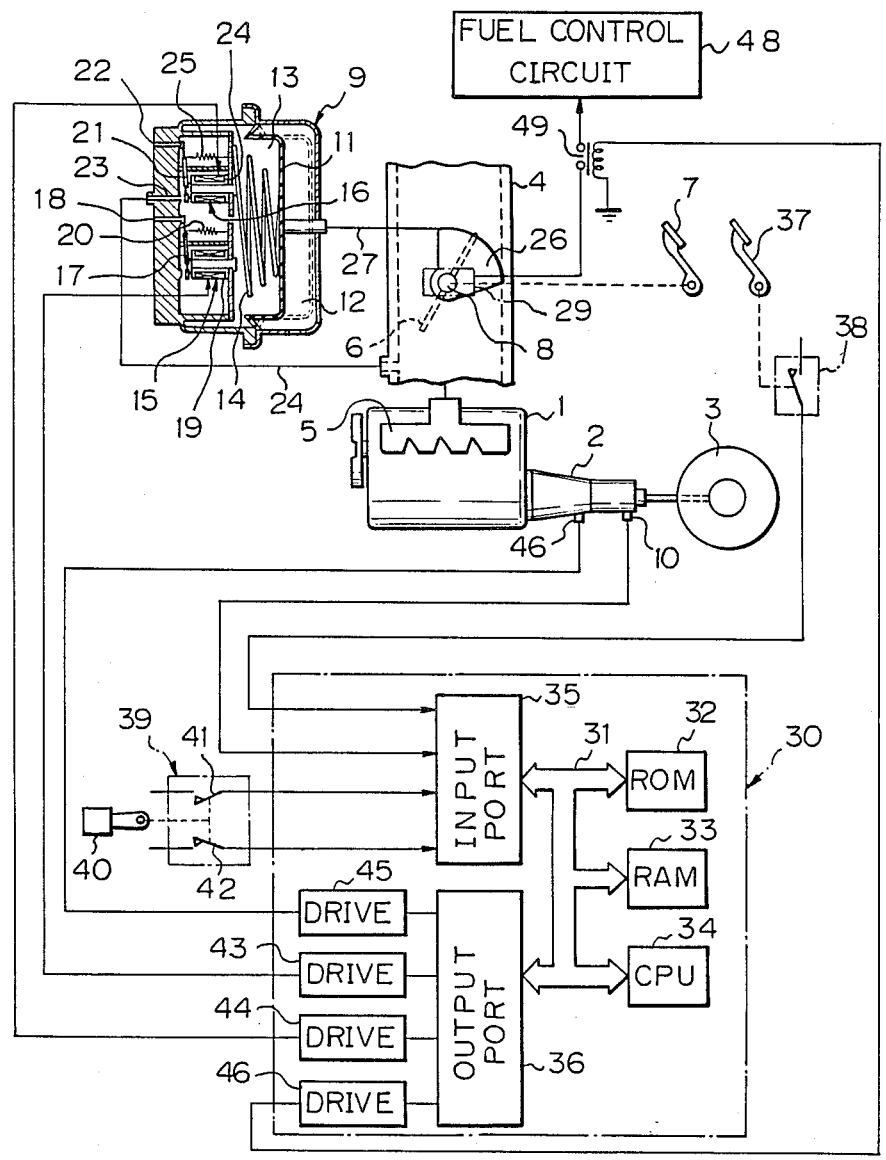
FIG. 8 is a schematic view of another constant-speed control device.

FIG. 8 shows another embodiment of the present invention. In this embodiment, the throttle switch 29 is connected to the fuel control circuit 48 through a relay 49, and a solenoid of the relay 49 is connected to a drive circuit 46 connected to the output port 36. Thus, at step 205 shown in FIG. 6, if a command signal is input for suspending a fuel cut, the solenoid of the relay 49 is energized and thus the ON signal of the throttle switch 29 is not transmitted to the fuel control circuit 48. As a result, the fuel control circuit 48 does not carry out a fuel cut operation even when the intake pipe 4 is completely closed by the throttle valve 6.

Note, that, since the release valve 15 is always turned ON for a constant-speed control, the suspension of the fuel cut operation may be carried out by an ON signal from the release valve 15.

Although the embodiments of the present invention have been described with reference to the attached drawings, many modifications and changes may be made by those skilled in this art without departing from the scope of the invention.

We claim:

1. A constant-speed control device for a vehicle, said device controlling a throttle valve provided in an intake passage of an internal combustion engine so that said vehicle runs at a constant speed set by a driver, said device comprising:

an actuator controlling the degree of opening of said throttle valve;

means for controlling said actuator in accordance with the vehicle speed to obtain constant-speed control;

means for sensing the degree of opening of said throttle valve;

means for supplying fuel to said engine;

means for preventing a fuel supply by said fuel supply means when the degree of opening of said throttle valve is smaller than a predetermined value; and means for suspending operation of said fuel supply prevention means in relation to a difference between the vehicle speed and a driver set constant-speed control target speed, during control of said actuator to obtain constant-speed control, whereby sudden increases and decreases in the vehicle speed about the constant speed-control target speed are reduced.

2. A constant-speed control device according to claim 1, wherein said suspending means suspends operation of said fuel supply prevention means until the vehicle speed becomes higher than the constant-speed control target speed by a first predetermined value.

3. A constant-speed control device according to claim 2, wherein, if the vehicle speed is decreased such that the absolute value of the difference between the constant-speed control target speed and the vehicle speed is smaller than or equal to a second predetermined value smaller than the first predetermined value while said preventing means prevents a fuel supply by said fuel supply means, said suspending means suspends operation of said fuel supply prevention means.

4. A constant-speed control device according to claim 1, wherein said sensing means generates a signal when the degree of opening of said throttle valve is smaller than a predetermined value.

5. A constant-speed control device according to claim 4, wherein said sensing means is an idle switch connected to said throttle valve.

6. A constant-speed control device according to claim 4, wherein said fuel supply prevention means prevents the fuel supply when said signal is received thereat, and said suspending means prevents a transmitting of said signal to said fuel supply prevention means to thereby suspend operation of said fuel supply prevention means.

7. A constant-speed control device according to claim 4, wherein said suspending means is provided with a relay which turns ON to allow said signal to be transmitted to said fuel supply prevention means and turns OFF to prevent said signal from being transmitted to said fuel supply prevention means.

* * * * *